United States Patent

Dyle

(10) Patent No.: US 10,259,396 B2
(45) Date of Patent: Apr. 16, 2019

(54) USB CORD CLEAT

(71) Applicant: GM Global Technology Operations LLC, Detroit, MI (US)

(72) Inventor: Taryn E. Dyle, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 929 days.

(21) Appl. No.: 14/291,498

(22) Filed: May 30, 2014

(65) Prior Publication Data

US 2015/0343960 A1    Dec. 3, 2015

(51) Int. Cl.
 B60R 13/00    (2006.01)
 B60R 11/00    (2006.01)
 B60R 16/02    (2006.01)

(52) U.S. Cl.
 CPC .............. B60R 11/00 (2013.01); B60R 16/02 (2013.01); *B60R 2011/0003* (2013.01); *B60R 2011/0007* (2013.01); *B60R 2011/0054* (2013.01); *B60R 2011/0064* (2013.01); *B60R 2011/0071* (2013.01)

(58) Field of Classification Search
 CPC .. H01R 9/2416; H01R 13/60; H01R 13/5833; B60R 11/00; B60R 2011/0001; B60R 2011/0007; B60R 2011/0071; B60R 2011/0003
 See application file for complete search history.

(56) References Cited

U.S. PATENT DOCUMENTS

| | | | |
|---|---|---|---|
| 7,275,956 B1 * | 10/2007 | Montesano | H01R 9/2416 439/13 |
| 2008/0116157 A1 * | 5/2008 | Fulbrook | A61M 5/1415 211/60.1 |
| 2011/0272959 A1 | 11/2011 | Lupton, III et al. | |
| 2013/0257363 A1 * | 10/2013 | Lota | H02J 7/0047 320/108 |
| 2013/0258604 A1 | 10/2013 | Quijano | |
| 2014/0106609 A1 * | 4/2014 | Strauser | G06F 1/1632 439/533 |
| 2014/0300322 A1 * | 10/2014 | Chien | H02J 7/0042 320/114 |
| 2015/0244127 A1 * | 8/2015 | Kim | B60N 3/14 439/34 |

FOREIGN PATENT DOCUMENTS

| | | |
|---|---|---|
| CN | 201690075 U | 12/2010 |
| CN | 201918600 U | 8/2011 |
| CN | 102386521 A | 3/2012 |
| CN | 202178476 U * | 3/2012 |
| KR | 20090004005 U | 4/2009 |

OTHER PUBLICATIONS

Chinese Office Action dated Feb. 3, 2017 ; Application No. 201510285264.0 ; Applicant: GM Global Technology Operations LLC.; 8 pages.

* cited by examiner

*Primary Examiner* — Rexford Barnie
*Assistant Examiner* — Rasem Mourad
(74) *Attorney, Agent, or Firm* — BrooksGroup

(57) ABSTRACT

The present invention generally relates to a vehicle component which may include an electronic port. The electronic port may be constructed and arranged to provide power to an electronic device. Additionally, a cleat may be disposed around the electronic port. The cleat may be constructed and arranged to hold a cord of the electronic device.

10 Claims, 2 Drawing Sheets

USB CORD CLEAT

TECHNICAL FIELD

The field to which the disclosure generally relates to includes vehicle systems including electronic systems.

BACKGROUND

Vehicles may have various electronic systems.

SUMMARY OF ILLUSTRATIVE VARIATIONS

A number of variations may include a vehicle component including an electronic port which may be constructed and arranged to provide power to an electronic device, along with a cleat which may be disposed around the electronic port. The cleat may be constructed and arranged to hold a cord of the electronic device.

A number of other variations may include a component which includes an electronic port. The electronic port may be constructed and arranged to provide power to an electronic device. Additionally, a cleat may be disposed about the electronic port. Moreover, the cleat may be constructed and arranged to organize a cord of the electronic device.

A number of other variations may include a method which may include the steps of first providing an electronic port. The electronic port may be constructed and arranged to provide power to an electronic device. Next, the electronic device may be plugged in to the electronic port using a cord. Finally, the cord may be wrapped around a cleat. The cleat may be integrally formed with the electronic port.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
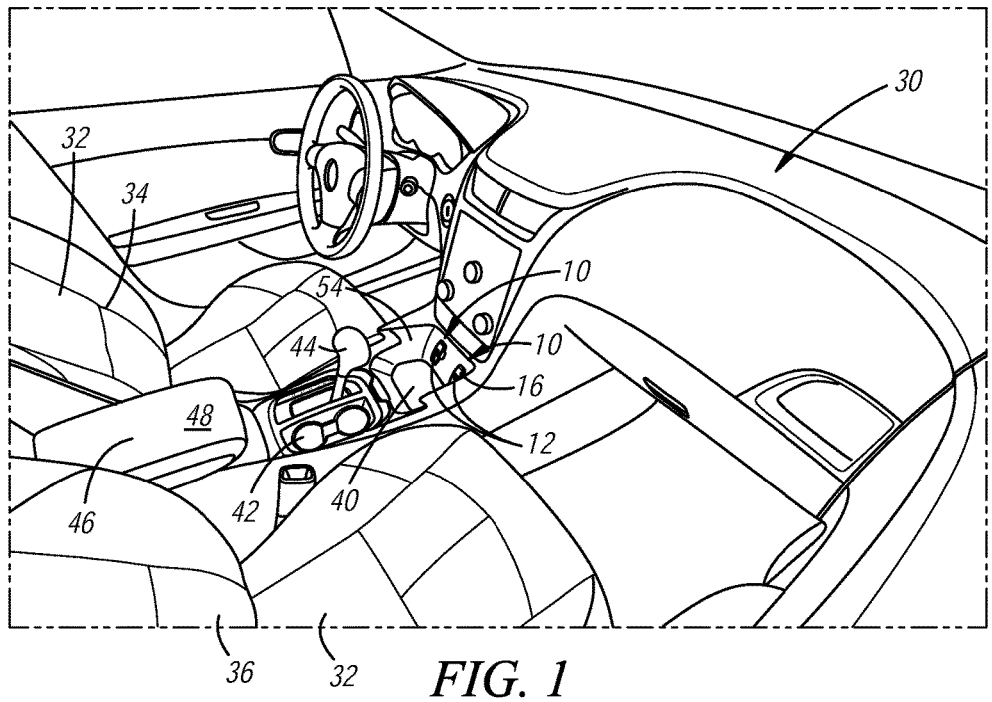
FIG. 1 shows a vehicle interior according to a number of variations.

The following description of the variations is merely illustrative in nature and is in no way intended to limit the scope of the invention, its application, or uses.

Referring to FIGS. 1-5, a vehicle component 10 may include an electronic port 12. The electronic port 12 may be constructed and arranged to provide power to an electronic device 14. Additionally, a cleat 16 may be disposed around the electronic port 12. Moreover, the cleat 16 may be constructed and arranged to hold a cord 18 of the electronic device 14.

Referring now to FIG. 1, a vehicle interior 30 may include many features including multiple vehicle seats 32 including but not limited to a front driver seat 34, a front passenger seat 36, and at least one rear passenger seat 38. Many vehicles may also include a center console 40 section which may be disposed between the front passenger seat 36 and the driver seat 34. The center console 40 may include various components such as cup holders 42, a gear shifter 44, and multiple compartments 46 which may include lids 48 to produce secured compartments.

It is contemplated that the electronic port 12 may be disposed anywhere in the vehicle interior 30 including but not limited to on a vehicle door, on the front or rear passenger seat, on the driver's seat, on a radio or driver information display, or any other location as desired by one of ordinary skill in the art. Moreover, a single vehicle interior 30 may include at least one, and may include many, electronic ports 12.

Figure 2:
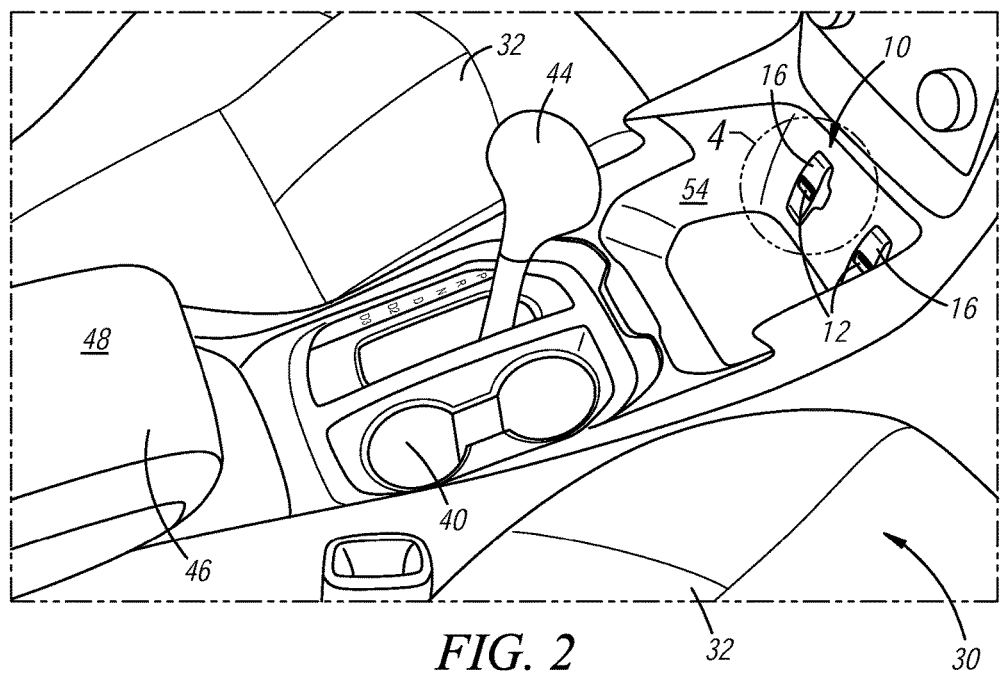
FIG. 2 shows a perspective view of the center console according to a number of variations.

Referring now to FIGS. 1 and 2, the electronic port 12 may be a USB connection port as illustrated in FIG. 1. It is also contemplated that the electronic port 12 may be an auxiliary port, a computer port, a display port, an Ethernet port, an HDMI port, or any other port as known by one of ordinary skill in the art. Each electronic port 12 may be of the same type or a single vehicle may include a mixture of various types of electronic ports 12.

Figure 3:
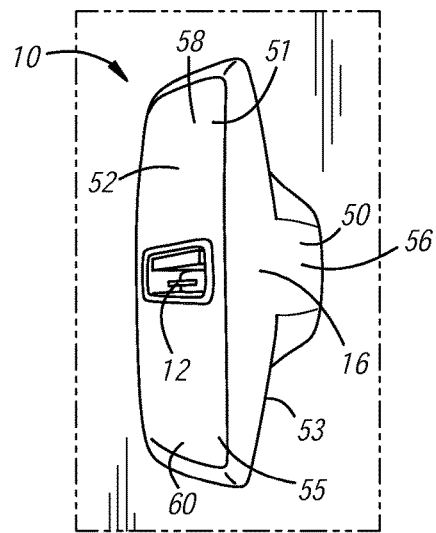
FIG. 3 is a side perspective view of the center console according to a number of variations.

Referring now to FIGS. 2 and 3, the cleat 16 may be operably coupled to the electronic port 12. As illustrated in the variations shown in FIGS. 2 and 3, the cleat 16 may be generally rectangular. It is also contemplated that the cleat 16 may be of any other shape including but not limited to triangular, circular, or oval shaped.

Referring now to FIG. 3, the cleat 16 may include a first portion 50 which may be operably coupled to a surface 54 of the vehicle interior 30, and a second portion 52 which may be configured to be disposed away from the surface 54 of the vehicle interior 30. The first portion 50 may be of any size or shape such that the first portion 50 protrudes outwardly from the surface 54 of the vehicle interior 30. The first portion 50 may also include at least one wing 51. The wing 51 may include an under surface 53 and may extend outwardly from the first portion 50. A second wing 55 may extend approximately 180 degrees from the first wing 51. Additionally, the second portion 52 may also be of any shape including rectangular, triangular, pointed or any other shape as known by one of ordinary skill in the art. The second portion 52 may include a stem path 56 which may be operably coupled to the center console 40 and may be constructed and arranged to be operably coupled with other electronic portions of the vehicle.

As illustrated in FIG. 3, the first portion 50 may be centrally disposed on the second portion 52. It is also contemplated that the first portion 50 may be disposed on a bottom 60 or top 58 of the second portion 52 or may be operably coupled to the second portion 52 in any location between the top 58 or the bottom 60. The first 50 and second 52 portions of the cleat 16 may include any material including but not limited to plastic, cloth, metal or any other material as known by one of ordinary skill in the art.

Moreover, it is contemplated that the cleat 16 may be integral with any portion of the vehicle interior 30. For example, the cleat 16 may be integrally formed with the center console during a plastic molding process. It is also contemplated that the cleat 16 may be added to the vehicle interior 30 after vehicle production is complete. Moreover, it is also contemplated that one or more cleats 16 may be integrally formed while other one or more cleats 16 may be added in at a later process.

Figure 4:
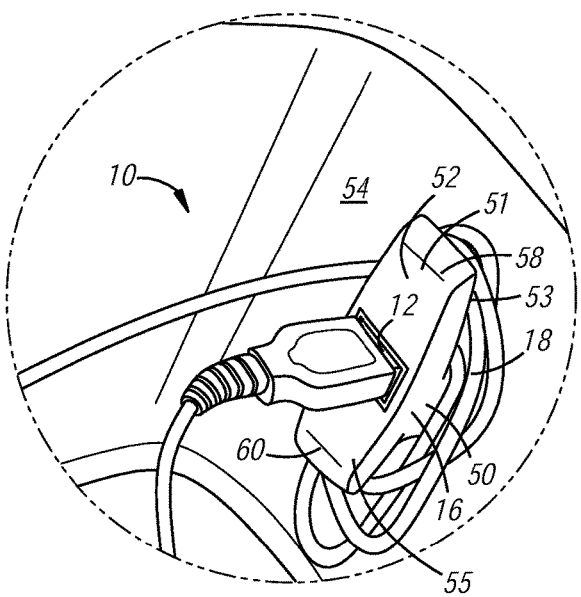
FIG. 4 is a side perspective view of a portion of the center console according to a number of variations.
Figure 5:
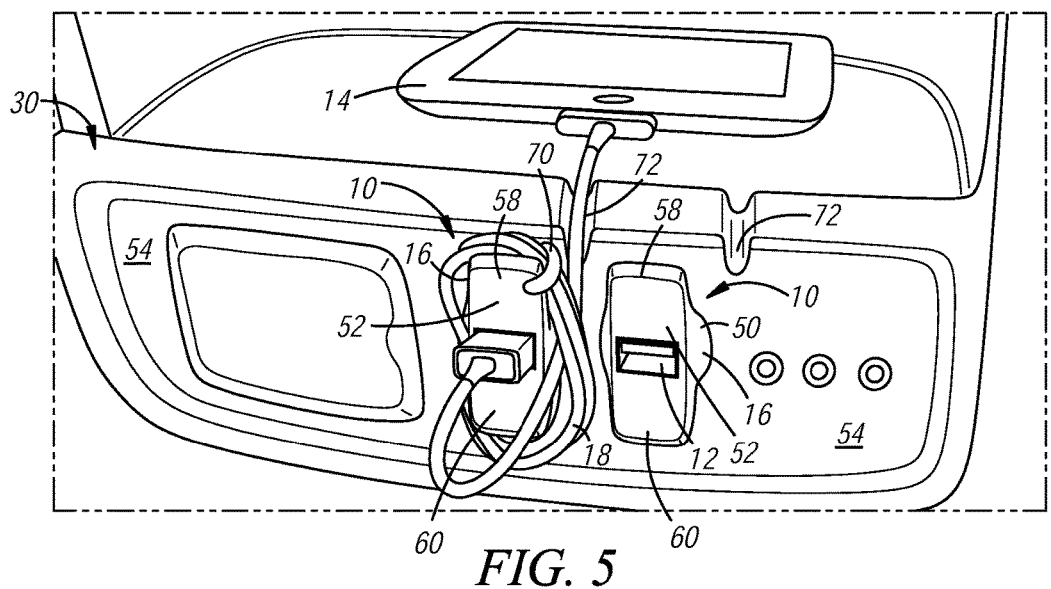
FIG. 5 is a front perspective view of the center console according to a number of variations.

Referring now to FIGS. 4 and 5, the cleat 16 may be constructed and arranged to allow the cord 18 to be wrapped around the cleat 16 and stored. It is contemplated that the cord 18 of the electronic device 14 may be stored by wrapping the cord 18 around the cleat 16 either when the electronic cord 18 is plugged in to the electronic port 12 or not. Further it is contemplated that the cord 18 may wrap around the cleat 16 such that the cord contacts the stem path 56 and the under surface 53 of the wing 51. A portion of the cord 18 may be wrapped around the stem path 56 and may be positioned between the under surface 53 of the wing 51 and the center console 40 or other surface of the vehicle interior 30. It is also contemplated that the cleat 16 may include a clip 70 which further secures the cord around the cleat. The clip may be a retaining ring, a spring clip, or any other clip as known by one of ordinary skill in the art. Additionally, the clip 70 may include a plastic polymer material, metal, or any other material as known by one of ordinary skill in the art to provide necessary rigidity to the clip.

As illustrated in FIG. 5 that the center console or other portion of the vehicle interior 30 may include divots 72 or other indents in order to provide user access to the electronic cord 18 without interfering with an enclosed portion or other portions of the center console 40.

Referring now to FIG. 5, in operation, a user may plug the electronic cord 18 into the electronic port 12. The user may then wrap the electronic cord 18 around the cleat 16 such that any excess length of the cord 18 may be securely held by the cleat 16. The user may then plug an opposite end of the cord 18 into the electronic device 14. The electronic port 12 may be configured to provide power and other electronic features to the electronic device 14. As there may be a plurality of electronic ports 12 disposed in the vehicle interior 30, the user may activate any or all of the electronic ports 12. Moreover, the electronic ports 12 may be active whether the vehicle itself is on or off.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a vehicle component including an electronic port which may be constructed and arranged to provide power to an electronic device. Additionally, a cleat may be disposed around the electronic port. Moreover, the cleat may be constructed and arranged to hold the cord of the electronic device.

Variation 2 may include a vehicle component as set forth in Variation 1 wherein the cleat may be integrally formed with the electronic port.

Variation 3 may include a vehicle component as set forth in any of Variations 1-2 wherein the cleat may be rectangular.

Variation 4 may include a vehicle component as set forth in any of Variations 1-3 wherein the port may be centrally disposed on the cleat.

Variation 5 may include a vehicle component as set forth in any of Variations 1-4 wherein the cleat may be disposed inside of the center console.

Variation 6 may include a vehicle component as set forth in any of Variations 1-5 wherein the cleat may be integral with the center console.

Variation 7 may include a vehicle component as set forth in any of Variations 1-6 wherein the cleat may further include a clip which may be constructed and arranged to securely hold the cord.

Variation 8 may include a vehicle component as set forth in any of Variations 1-7 wherein the cleat may be comprised of a plastic polymer material.

Variation 9 may include a component which may include an electronic port constructed and arranged to provide power to an electronic device. Additionally, a cleat may be disposed about the electronic port. Additionally, the cleat may be constructed and arranged to organize a cord of the electronic device.

Variation 10 may include a component according to Variation 9 wherein the cleat may be integrally formed with the electronic port.

Variation 11 may include a component as set forth in any of Variations 9 and 10 wherein the cleat may be rectangular.

Variation 12 may include the component as set forth in any of Variations 9-11 wherein the port may be centrally disposed on the cleat.

Variation 13 may include the component as set forth in any of Variations 9-12 wherein the cleat may be disposed inside of a center console.

Variation 14 may include a component as set forth in any of Variations 9-13 wherein the cleat may be integral with the center console.

Variation 15 may include a component as set forth in any of Variations 9-14 wherein the cleat may further include a clip which may be constructed and arranged to securely hold the cord.

Variation 16 may include a component as set forth in any of Variations 9-15 wherein the cleat may be comprised of a plastic polymer material.

Variation 17 may include a method which may include the steps of first providing an electronic port which may be constructed and arranged to provide power to an electronic device. Next, the electronic device may be plugged into the electronic port using a cord. Finally, the cord may be wrapped around the cleat which may be integrally formed with the electronic port.

Variation 18 may include the method as set forth in Variation 17 wherein the cleat may be disposed inside of a center console.

Variation 19 may include the method as set forth in any of Variations 17 or 18 wherein the cleat may be integral with the center console.

Variation 20 may include the method according to any of Variations 17-19 and may further comprise the step of securing the cord around the cleat using a clip.

The above description of select variations within the scope of the invention is merely illustrative in nature and, thus, variations or variants thereof are not to be regarded as a departure from the spirit and scope of the invention.

What is claimed is:

1. A product consisting of:
    an electronic port constructed and arranged to provide power to an electronic device;
    a cleat disposed around and integrally formed with the electronic port in a vehicle, the electronic port centrally disposed within the cleat, wherein the cleat is constructed and arranged to hold a cord of the electronic device, the cleat consisting of a first portion, a first wing, and a second wing, the first wing extending outwardly from the first portion and the second wing extending outwardly from the first portion opposite the first wing; and a clip constructed and arranged to securely hold the cord to the cleat.

2. The vehicle component of claim 1, wherein the cleat is rectangular.

3. The vehicle component of claim 1, wherein the cleat is disposed inside of a center console.

4. The vehicle component of claim 3, wherein the cleat is integral with the center console.

5. The vehicle component of claim 1, wherein the cleat is comprised of a plastic polymer material.

6. A component consisting of:

an electronic port constructed and arranged to provide power to an electronic device;

a rectangular cleat disposed around and integrally formed with the electronic port in a vehicle, the electronic port centrally disposed within the cleat, consisting of a first portion surrounding at least a portion of the electronic port, the first portion being coupled to a central console and a second portion disposed away from the central console and which is constructed and arranged to hold a cord of the electronic device, the second portion consisting of a first wing and a second wing, the first wing extending outwardly from the first portion and the second wing extending outwardly from the first portion opposite the first wing and wherein the cleat further includes a clip constructed and arranged to securely hold the cord wherein the cleat is integral with the center console.

7. The vehicle component of claim 6, wherein the cleat is disposed inside of the center console.

8. The vehicle component of claim 6, wherein the cleat is comprised of a plastic polymer material.

9. A method consisting of the steps of:

providing an electronic port constructed and arranged to provide power to an electronic device, the electronic port centrally disposed within and integrally formed with a cleat consisting of a first portion, a first wing, and a second wing, the first wing extending outwardly from the first portion and the second wing extending outwardly from the first portion opposite the first wing, the cleat being disposed inside of a center console of a vehicle;

plugging the electronic device into the electronic port using a cord;

wrapping the cord around the cleat which is integrally formed with the electronic port; and securing the cord around the cleat using a clip.

10. The method of claim 9, wherein the cleat is integral with the center console.

* * * * *